(12) United States Patent
Kumaki et al.

(10) Patent No.: US 10,214,604 B2
(45) Date of Patent: *Feb. 26, 2019

(54) VINYL ALCOHOL POLYMER AND USE THEREOF

(71) Applicant: KURARAY CO., LTD., Kurashiki-shi (JP)

(72) Inventors: Yosuke Kumaki, Kurashiki (JP); Ayumu Yamamoto, Kurashiki (JP); Tatsuya Tanida, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 18 days.

This patent is subject to a terminal disclaimer.

(21) Appl. No.: 15/519,192

(22) PCT Filed: Oct. 16, 2015

(86) PCT No.: PCT/JP2015/079298
§ 371 (c)(1),
(2) Date: Apr. 14, 2017

(87) PCT Pub. No.: WO2016/060241
PCT Pub. Date: Apr. 21, 2016

(65) Prior Publication Data
US 2017/0226247 A1    Aug. 10, 2017

(30) Foreign Application Priority Data

Oct. 17, 2014  (JP) .................................. 2014-213128

(51) Int. Cl.

| | | |
|---|---|---|
| *C09D 129/04* | (2006.01) | |
| *C09J 7/21* | (2018.01) | |
| *C08F 16/06* | (2006.01) | |
| *D21H 19/20* | (2006.01) | |
| *C08F 216/06* | (2006.01) | |
| *D21H 27/00* | (2006.01) | |
| *C09J 7/20* | (2018.01) | |

(52) U.S. Cl.
CPC ............ *C08F 216/06* (2013.01); *C08F 16/06* (2013.01); *C09D 129/04* (2013.01); *C09J 7/201* (2018.01); *C09J 7/21* (2018.01); *D21H 19/20* (2013.01); *D21H 27/00* (2013.01); *D21H 27/001* (2013.01); *C09J 2400/28* (2013.01); *C09J 2429/005* (2013.01); *C09J 2483/00* (2013.01)

(58) Field of Classification Search
None
See application file for complete search history.

(56) References Cited

U.S. PATENT DOCUMENTS 9,951,161 B2 * 4/2018 Kumaki .................. C08F 8/12
2013/0040134 A1 2/2013 Dufour et al.

FOREIGN PATENT DOCUMENTS

| GB | 1 601 641 A | 11/1981 |
|---|---|---|
| JP | 53-26830 A | 3/1978 |
| JP | 7-286153 A | 10/1995 |
| JP | 11-279986 A | 10/1999 |
| JP | 2001-72720 A | 3/2001 |
| JP | 2005-89492 A | 4/2005 |
| JP | 2005-194672 A | 7/2005 |
| JP | 2006-89536 A | 4/2006 |
| JP | 2013-79374 A | 5/2013 |
| JP | 2013-531136 A | 8/2013 |
| WO | 2011/104427 A1 | 9/2011 |
| WO | 2014/171502 A1 | 10/2014 |
| WO | 2015/005153 A1 | 1/2015 |

OTHER PUBLICATIONS

International Search Report dated Jan. 12, 2016, in PCT/JP2015/079298, filed Oct. 16, 2015.
EESR issued in European Patent Application No. 15 851 153.5 on Apr. 17, 2018.

* cited by examiner

*Primary Examiner* — Sheeba Ahmed
(74) *Attorney, Agent, or Firm* — Oblon, McClelland, Maier & Neustadt, L.L.P.

(57) ABSTRACT

There is provided a vinyl alcohol-based polymer having an ethylenic double bond with a saponification degree of 70 mol % or more, wherein the vinyl alcohol-based polymer is water-soluble; a molar ratio of the ethylenic double bond to the total of vinyl alcohol units and vinyl acetate units is 0.05/100 to 2/100; and a limiting viscosity [η] and a weight-average molecular weight Mw of a vinyl ester-based polymer which is produced by esterifying the vinyl alcohol-based polymer satisfy the following formulas (1) and (2).

$$4.7 \leq \log Mw \, 6.3 \qquad (1)$$

$$0.60 < (\log [\eta] + 3.75)/\log Mw < 0.69 \qquad (2)$$

8 Claims, 3 Drawing Sheets

[Fig 1]
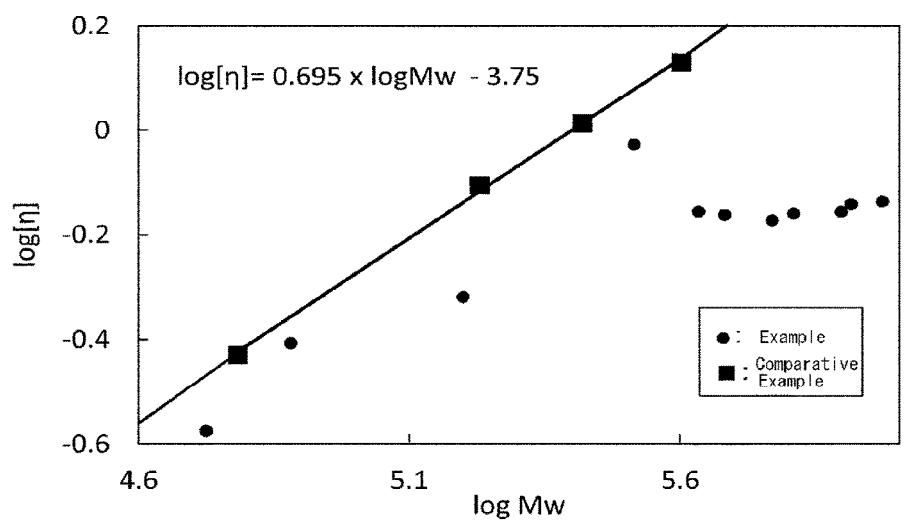

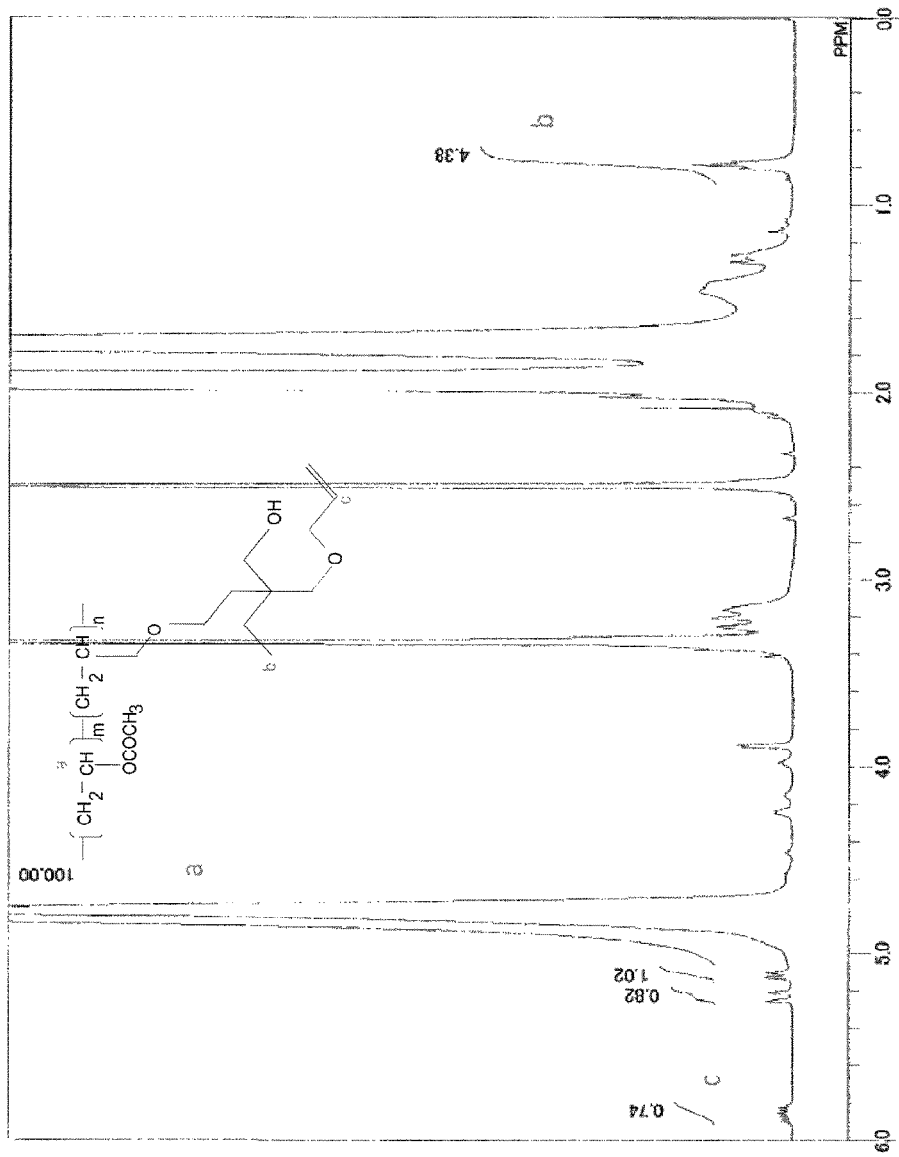
[Fig 2]

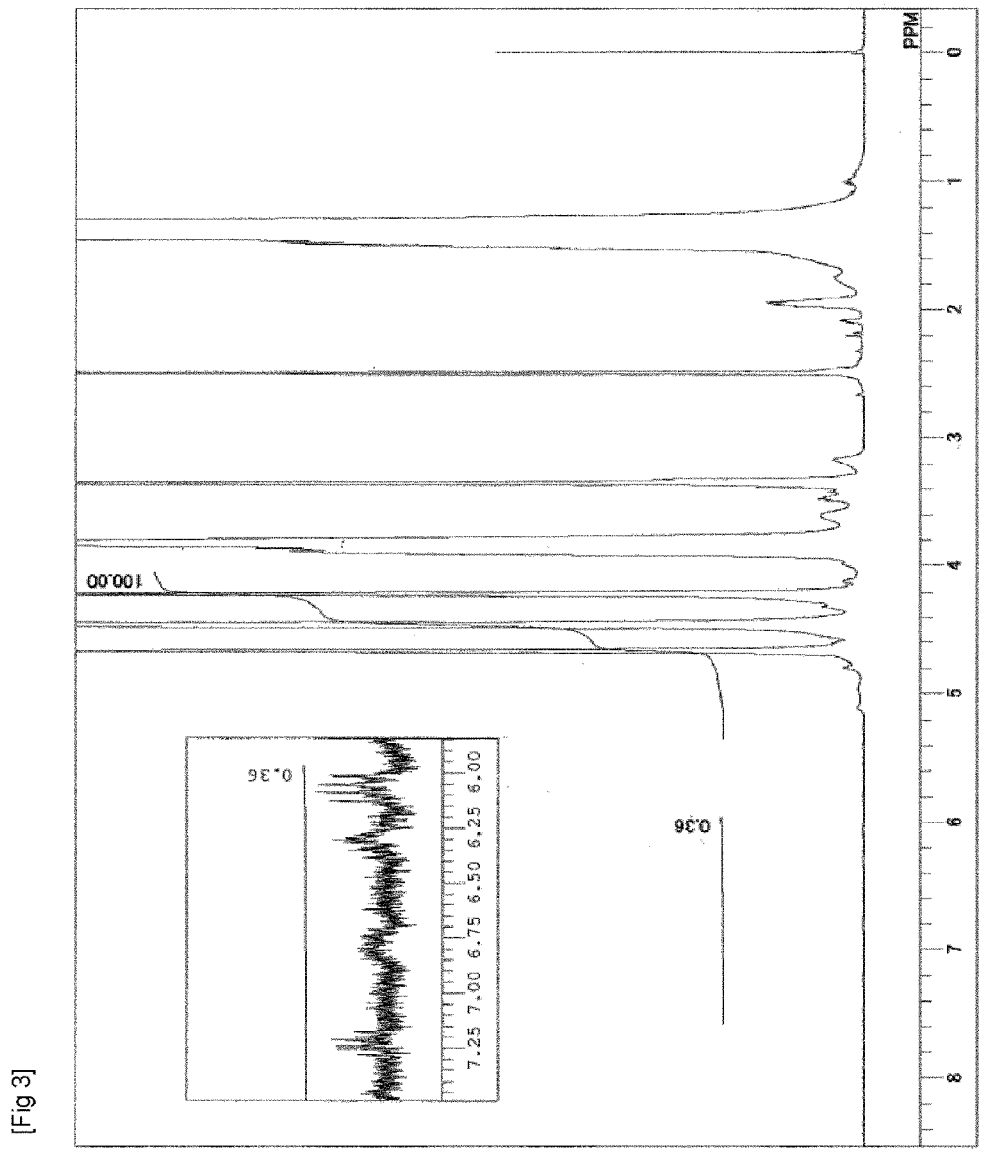
[Fig 3]

VINYL ALCOHOL POLYMER AND USE THEREOF

TECHNICAL FIELD

The present invention relates to a vinyl alcohol-based polymer having an ethylenic double bond. The present invention also relates to an aqueous solution comprising the vinyl alcohol-based polymer, and a coating agent comprised of the aqueous solution. Furthermore, the present invention relates to a coated article wherein the coating agent described above is coated on the surface of a paper or film substrate.

BACKGROUND ART

A vinyl alcohol-based polymer (hereinafter, abbreviated as "PVA") has been extensively used as a clear coating agent or a pigment coating agent for improving paper surface properties such as surface strength, smoothness, gloss, gas barrier performance, water resistance, printability, oil resistance.

A proportion of south-sea wood and used paper in a raw material for pulp has been increased, and along with this, paper surface strength tends to be reduced. Thus, in the light of performance of a coated paper, it is necessary to further improve paper surface properties. For a paper used for offset printing using water, high water resistance is required. Furthermore, for a barrier paper, high barrier performance is required. A representative example of a barrier paper is a base paper for a release paper. A base paper for a release paper is generally produced by coating the surface of a cellulose substrate with a PVA. Then, a release layer (silicone layer) is formed on the surface of the base paper for a release paper to afford a release paper. The PVA in the release paper serves as a barrier for preventing an expensive silicone from permeating a substrate. Nowadays, a PVA, which has not only barrier performance but also excellent adhesiveness between a paper substrate and a silicone layer, is required.

In order to improve productivity of a coated paper, a coating speed has increased, so that further reduction of viscosity of an aqueous solution of PVA is needed. For a blade coater, for example, a shear rate applied to a coating liquid during coating is frequently $10^6$/s or more. At a high shear rate of $10^6$/s or more applied to a conventional aqueous PVA-containing solution, the PVA in the aqueous solution tends to orientate and crystallize, leading to coating stripe and thus difficulty in uniform coating on a paper surface. Such a problem would be solved by, for example, reducing a polymerization degree of the PVA, reducing a saponification degree, or introducing an ionic group. However, a PVA with a low polymerization degree has the drawbacks of low coat strength and insufficient improvement in surface strength of a coated paper. A PVA with a low saponification degree or to which an ionic group has been introduced has the drawbacks of deteriorated water resistance of a dry coat, a low drying speed and so on.

Patent Reference No. 1 has described a base paper for a release paper coated with a silyl group-containing vinyl alcohol-based polymer which meets particular conditions. Coating with such a vinyl alcohol-based polymer is very effective for improving barrier performance of a cellulose substrate. However, it is not very effective for improving adhesiveness between a substrate and a silicone layer. Furthermore, viscosity of an aqueous solution tends to be equivalent to or higher than a common vinyl alcohol-based polymer, leading to problems in high-speed coatability.

Patent Reference No. 2 has described a cellulose substrate coated with a vinyl alcohol-based polymer in which a double bond is introduced in a side chain by acetalization. Coating with such a vinyl alcohol-based polymer is effective for improving adhesiveness between a substrate and a silicone layer, but viscosity of a solution tends to be equivalent to or higher than a common vinyl alcohol-based polymer, leading to problems in high-speed coatability.

Patent Reference No. 3 has described a coating agent for a paper made of a vinyl alcohol-based polymer prepared by polymerizing a vinyl ester at a temperature higher by 2 to 80° C. than a boiling point of a reaction solution and saponifying the vinyl ester-based polymer obtained. Such a vinyl alcohol-based polymer results in increase in the amount of 1,2-glycol bonds in a polymer main chain, slight inhibition of orientation and crystallization under a high shear force and excellent high-speed coatability. However, an aqueous solution thereof unfavorably has viscosity not so different from that of a common vinyl alcohol-based polymer, and water resistance lower than a common vinyl alcohol-based polymer.

PRIOR ART REFERENCES

Patent References

Patent Reference No. 1: JP 2005-194672 A
Patent Reference No. 2: WO 2011/104427 A1
Patent Reference No. 3: JP 11-279986 A

SUMMARY OF THE INVENTION

Problems to be Solved by the Invention

To solve the above problems, an objective of the present invention is to provide a vinyl alcohol-based polymer excellent in high-speed coatability when being used as a coating agent as well as in water resistance and barrier performance of a film obtained by coating a paper or film substrate with the coating agent. Another objective is to provide a coated article which is highly adhesive to a release layer.

Means for Solving the Problems

The above problems can be solved by providing a vinyl alcohol-based polymer having an ethylenic double bond with a saponification degree of 70 mol % or more, wherein the vinyl alcohol-based polymer is water-soluble; a molar ratio of the ethylenic double bond to the total of vinyl alcohol units and vinyl acetate units is 0.05/100 to 2/100; and a limiting viscosity [η] and a weight-average molecular weight Mw of a vinyl ester-based polymer which is produced by esterifying the vinyl alcohol-based polymer satisfy the following formulas (1) and (2).

$$4.7 \leq \log Mw \leq 6.3 \quad (1)$$

$$0.60 < (\log [\eta]+3.75)/\log Mw < 0.69 \quad (2)$$

In the above vinyl alcohol-based polymer, it is preferable that a main chain contains the ethylenic double bond. It is also preferable that a side chain contains the ethylenic double bond.

A preferable embodiment of the present invention is an aqueous solution comprising the vinyl alcohol-based polymer. Here, preferred is a coating agent comprised of the aqueous solution.

The above problems can be also solved by providing a coated article wherein the coating agent is coated on the surface of a paper or film substrate. The problems can be also solved by providing a base paper for a release paper wherein the coating agent is coated on the surface of a paper substrate. The problems can be also solved by providing a release paper comprising the base paper for a release paper and a release layer formed on the surface of the base paper for a release paper.

Effects of the Invention

A vinyl alcohol-based polymer of the present invention gives an aqueous solution with a low viscosity, and a coating agent comprised of the aqueous solution is, therefore, excellent in high-speed coatability. A film obtained by coating a paper or film substrate with the coating agent is excellent in water resistance and barrier performance. Furthermore, a release paper or a release film in which a release layer is formed on a coated surface is excellent in adhesiveness between the coated surface and the release layer.

BRIEF DESCRIPTION OF THE DRAWINGS

FIG. 1 is a double logarithmic chart in which a logarithm of a weight-average molecular weight Mw is plotted to a horizontal axis while a logarithm of a limiting viscosity [η] is plotted to a vertical axis for Examples and Comparative Examples.

FIG. 2 is a $^1$H-NMR spectrum of a polyvinyl acetate obtained in Example 1.

FIG. 3 is a $^1$H-NMR spectrum of a vinyl alcohol-based polymer obtained in Example 11.

MODES FOR CARRYING OUT THE INVENTION

A vinyl alcohol-based polymer of the present invention is characterized in that it is water-soluble even though it has a given number of ethylenic double bonds and for a vinyl ester-based polymer prepared by esterifying the vinyl alcohol-based polymer, a limiting viscosity [η] and a weight-average molecular weight Mw satisfy formulas (1) and (2). A coating agent containing such a vinyl alcohol-based polymer exhibits excellent high-speed coatability. Furthermore, the coated surface of the coated article obtained is excellent in water resistance and barrier property, as well as adhesiveness to a release layer.

$$4.7 \leq \log\ Mw \leq 6.3 \tag{1}$$

$$0.60 < (\log\ [\eta]+3.75)/\log\ Mw < 0.69 \tag{2}$$

Herein, a limiting viscosity [η] is measured in tetrahydrofuran (THF) at 40° C.

In the light of high-speed coatability of a coating agent and water resistance and barrier property of a coated surface, it is essential that a weight-average molecular weight Mw and a limiting viscosity [η] of a vinyl alcohol-based polymer satisfy the above formulas (1) and (2). Meaning of formulas (1) and (2) will be described with reference to FIG. 1. FIG. 1 is a double logarithmic chart in which a logarithm of a weight-average molecular weight Mw is plotted to a horizontal axis while a logarithm of a limiting viscosity [η] is plotted to a vertical axis for a vinyl ester-based polymer prepared by esterifying a commercially available vinyl alcohol-based polymer (Kuraray Co., Ltd., "PVA-105", "PVA-117", "PVA-124" or "PVA-145") used in Comparative Examples described later. A base of the logarithm is 10. As shown in FIG. 1, a logarithm of a limiting viscosity [η] is represented by a linear function of a logarithm of a weight-average molecular weight Mw (formula (3)).

$$\log\ [\eta]=0.695 \times \log\ Mw-3.75 \tag{3}$$

In the light of high-speed coatability, it is preferable that a limiting viscosity [η] of a vinyl alcohol-based polymer contained in a coating agent is low. On the other hand, in the light of water resistance and barrier property of a coated surface, it is preferable that a weight-average molecular weight Mw of a vinyl alcohol-based polymer contained in a coating agent is high. However, for a general-purpose unmodified vinyl alcohol-based polymer, a logarithm of a weight-average molecular weight Mw and a logarithm of a limiting viscosity [η] are plotted on one straight line, so that it is not easy to reduce a limiting viscosity [η] while a weight-average molecular weight Mw is increased. As a result of investigation, the inventors have achieved a water-soluble vinyl alcohol-based polymer which has a high weight-average molecular weight Mw but a low limiting viscosity [η]. For example, these properties of a vinyl alcohol-based polymer can be controlled by regulating reaction conditions such as reactivity of a polyfunctional monomer which is to be copolymerized with vinyl acetate, and by controlling a branch structure in the polymer prepared by heating the vinyl alcohol-based polymer.

Here, furthermore, for vinyl ester-based polymers prepared by esterifying the vinyl alcohol-based polymers obtained in Examples 1 to 11, a weight-average molecular weight Mw and a limiting viscosity [η] were measured and a logarithm of a weight-average molecular weight Mw and a logarithm of a limiting viscosity [η] obtained were plotted in FIG. 1. As shown in FIG. 1, for the vinyl alcohol-based polymer of the present invention, the logarithm of a weight-average molecular weight Mw and the logarithm of a limiting viscosity [η] were plotted below the straight line given by formula (3). Thus, a range of a weight-average molecular weight Mw of the vinyl alcohol-based polymer of the present invention was defined by formula (1), and relationship between a limiting viscosity [η] and a weight-average molecular weight Mw was defined by formula (2).

In FIG. 1, the region indicated by formulas (1) and (2) is as described below. A (log [η]+3.75)/log Mw in formula (2) indicates a slope of a straight line with a y intercept of −3.75. Thus, the region given by formula (2) is below the straight line defined by formula (4) and above the straight line defined by formula (5). Since formula (1) defines a weight-average molecular weight Mw, the region given by formula (1) and formula (2) in FIG. 1 is the region delimited by the four straight lines defined by formulas (4) to (7).

$$\log\ [\eta]=0.69 \times \log\ Mw-3.75 \tag{4}$$

$$\log\ [\eta]=0.60 \times \log\ Mw-3.75 \tag{5}$$

$$\log\ Mw=4.7 \tag{6}$$

$$\log\ Mw=6.3 \tag{7}$$

In formula (1), if a log Mw is less than 4.7, either water resistance or barrier property of a coated surface may be deteriorated. A log Mw is preferably 5.0 or more. If a Log Mw is more than 6.3, an aqueous solution becomes so viscous that coating cannot be uniform or, if can, high-speed coatability may be deteriorated. Thus, a log Mw is preferably 6.0 or less.

In formula (2), if a (log [η]+3.75)/log Mw is 0.69 or more, high-speed coatability is deteriorated when it is used as a coating agent. A (log [η]+3.75)/log Mw is preferably less than 0.68, more preferably less than 0.67. It is difficult to produce a polymer with a (log [η]+3.75)/log Mw of 0.60 or less.

The phrase, "a vinyl alcohol-based polymer is water-soluble" as used herein means that a vinyl alcohol-based polymer can give an aqueous solution in which the vinyl alcohol-based polymer is completely dissolved at a concentration of 4% by mass at a temperature of 90° C.

A vinyl alcohol-based polymer of the present invention has an ethylenic double bond. In the light of adhesiveness between a coated surface and a release layer, it is important that a molar ratio of the ethylenic double bond(s) to the total of vinyl alcohol units and vinyl acetate units is 0.05/100 to 2/100. If the molar ratio is less than 0.05/100, adhesiveness between the coated surface and the release layer is lower. The molar ratio is preferably 0.08/100 or more, more preferably 0.1/100 or more. If the molar ratio is more than 2/100, the vinyl alcohol-based polymer may not be dissolved in water. A molar ratio of ethylenic double bond(s) is preferably 1/100 or less, more preferably 0.8/100 or less.

The amount of ethylenic double bonds introduced is determined from a $^1$H-NMR spectrum of the vinyl alcohol-based polymer in deuterated water or deuterated dimethyl sulfoxide solvent, or a $^1$H-NMR spectrum of a vinyl ester-based polymer before saponification in deuterated chloroform solvent.

Preferably, a main chain of a vinyl alcohol-based polymer of the present invention contains the ethylenic double bond. A vinyl alcohol-based polymer in which a main chain has an ethylenic double bond can be preferably produced by, but not limited to, a process comprising polymerizing vinyl acetate to provide a vinyl ester-based polymer, saponifying the vinyl ester-based polymer and heating the vinyl alcohol-based polymer thus obtained.

A polymerization method can be, for example, bulk polymerization, solution polymerization, suspension polymerization, emulsion polymerization or the like. The polymerization can be performed neat or in the presence of an alcoholic solvent. Among these, preferred is neat bulk polymerization or solution polymerization using an alcoholic solvent. Examples of an alcoholic solvent which can be used include, but not limited to, methanol, ethanol and propanol. These can be used alone or in combination of two or more. A polymerization style can be, but not limited to, any of batch polymerization, semi-batch polymerization, continuous polymerization and semi-continuous polymerization.

A polymerization temperature is preferably, but not limited to, 0 to 200° C., more preferably 30 to 140° C. If the polymerization temperature is lower than 0° C., a rate of polymerization may be unsatisfactory. If the polymerization temperature is higher than 200° C., there is a concern that vinyl acetate and other monomers are decomposed.

A temperature can be controlled by, for example, balancing between heat generated in polymerization and heat loss from the surface of a polymerization vessel. Alternatively, a temperature can be controlled by means of an external jacket using an appropriate heat medium. From a safety standpoint, the latter method is preferable.

A polymerization initiator can be selected from well-known initiators (for example, azo initiators, peroxide initiators, redox initiators and so on) depending on a polymerization method. Examples of an azo initiator include 2,2'-azobisisobutyronitrile, 2,2'-azobis(2,4-dimethylvaleronitrile) and 2,2'-azobis(4-methoxy-2,4-dimethylvaleronitrile). Examples of a peroxide initiator include percarbonates such as diisopropyl peroxydicarbonate, di-2-ethylhexyl peroxydicarbonate and diethoxyethyl peroxydicarbonate; perester compounds such as t-butyl peroxyneodecanate, α-cumyl peroxyneodecanate and t-butyl peroxydecanate; acetylcyclohexylsulfonyl peroxide; and 2,4,4-trimethylpentyl-2-peroxyphenoxy acetate. The above initiator can be combined with, for example, potassium persulfate, ammonium persulfate or hydrogen peroxide, to be an initiator. A redox initiator can be, for example, a combination of the above peroxide with a reducing agent such as sodium bisulfite, sodium bicarbonate, tartaric acid, L-ascorbic acid and Rongalite. When the polymerization is conducted at a higher temperature, coloration due to decomposition of vinyl acetate may be observed. In such a case, it is quite acceptable to add an antioxidant such as tartaric acid to a polymerization system in about 1 to 100 ppm based on vinyl acetate for preventing coloration.

In polymerization of vinyl acetate, additional monomer(s) can be copolymerized, without departing the scope of the present invention. Examples of such additional monomers include α-olefins such as ethylene and propylene; (meth)acrylic acid and its salts; (meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate and octadecyl (meth)acrylate; (meth)acrylamide; (meth)acrylamide derivatives such as N-methyl(meth)acrylamide, N-ethyl (meth)acrylamide, N,N-dimethyl(meth)acrylamide, diacetone(meth)acrylamide, (meth)acrylamidopropanesulfonic acid and its salts, (meth)acrylamidopropyldimethylamine and its salts or quaternary salts, N-methylol(meth)acrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyl compounds such as vinyl chloride and vinyl fluoride; halogenated vinylidenes such as vinylidene chloride and vinylidene fluoride; allyl compounds such as allyl acetate and allyl chloride; unsaturated dicarboxylic acids such as maleic acid, itaconic acid and fumaric acid and their salts or esters; vinylsilyl compounds such as vinyltrimethoxysilane; and isopropenyl acetate. The amount of such additional monomer(s) involved in copolymerization is generally 5 mol % or less.

A rate of polymerization of vinyl acetate is preferably 20 to 95%. If the rate of polymerization is less than 20%, the amount of a vinyl ester-based polymer produced per unit time may be reduced, leading to reduction in production efficiency. Furthermore, a cost for recovering vinyl acetate may be increased. In the light of a production efficiency and a cost, the rate of polymerization is more preferably 30% or more, furthermore 40% or more.

In polymerization of vinyl acetate, a chain transfer agent can coexist in order to regulate a polymerization degree of the vinyl alcohol-based polymer produced. Examples of a chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethanethiol; and halogenated hydrocarbons such as trichloroethylene and perchloroethylene; particularly preferable are aldehydes and ketones. The amount of a chain transfer agent is determined, depending on a chain transfer constant of a chain transfer agent added and a targeted polymerization degree of a vinyl alcohol-based polymer, but in general, it is desirably 0.1 to 10% by mass based on vinyl acetate.

The saponification method can be alcoholysis or hydrolysis using a basic catalyst such as sodium hydroxide, potassium hydroxide and sodium methoxide or an acidic catalyst such as p-toluenesulfonic acid. Examples of a solvent which can be used in the reaction include alcohols such as methanol and ethanol; esters such as methyl acetate and ethyl acetate; ketones such as acetone and methyl ethyl ketones: and aromatic hydrocarbons such as benzene and toluene. These solvents can be used alone or in combination of two or more. It is particularly convenient and preferable that saponification is conducted using methanol or a mixture of methanol/methyl acetate as a solvent and sodium hydroxide as a catalyst.

By heating the vinyl alcohol-based polymer, an ethylenic double bond can be introduced to a main chain. The heating can be preferably conducted under the air stream. A heating temperature is preferably 100 to 150° C. A heating period is generally 2 to 10 hours.

It is also preferable that a side chain of the vinyl alcohol-based polymer of the present invention has an ethylenic double bond. There are no particular restrictions to a method for producing a vinyl alcohol-based polymer in which a side chain has an ethylenic double bond, but preferred is a method comprising copolymerizing vinyl acetate with a polyfunctional monomer having a plurality of ethylenic double bonds to form a vinyl ester-based copolymer and saponifying the vinyl ester-based copolymer.

There are no particular restrictions to the polyfunctional monomer as long as it has two or more ethylenic double bonds in one molecule. However, deterioration of water solubility of a vinyl alcohol-based polymer due to excessively proceeding a crosslinking reaction must be prevented while a required number of double bonds must be introduced. It is necessary to select a polyfunctional monomer which is appropriately reactive, taking various factors into consideration, including a blending ratio of the polyfunctional monomer to vinyl acetate, a polymerization temperature, a monomer concentration, a rate of polymerization and a polymerization degree. In the light of preventing excessive crosslinking reaction, the polyfunctional monomer preferably has two ethylenic double bonds.

Among others, preferred are monomers having a vinyl ether group including divinyl ether compounds such as ethanediol divinyl ether, propanediol divinyl ether, butanediol divinyl ether, ethyleneglycol divinyl ether, diethyleneglycol divinyl ether, triethyleneglycol divinyl ether, polyethyleneglycol divinyl ether, propyleneglycol divinyl ether and polypropyleneglycol divinyl ether. Such a monomer can be copolymerized with vinyl acetate, to afford a vinyl alcohol-based polymer in which a side chain has a vinyl ether group.

A monomer having an allyl group is also preferable. Examples of a monomer having an allyl group include diene compounds such as pentadiene, hexadiene, heptadiene, octadiene, nonadiene and decadiene; diallyl ether compounds such as glycerol diallyl ether, diethyleneglycol diallyl ether, ethyleneglycol diallyl ether, triethyleneglycol diallyl ether, polyethyleneglycol diallyl ether, trimethylolpropane diallyl ether and pentaerythritol diallyl ether; triallyl ether compounds such as glycerol triallyl ether, trimethylolpropane triallyl ether and pentaerythritol triallyl ether; monomers having an allyl ether group including tetraallyl ether compounds such as pentaerythritol tetraallyl ether; monomers having an allyl ester group including diallyl carboxylates such as diallyl phthalate, diallyl maleate, diallyl itaconate, diallyl terephthalate and diallyl adipate; monomers having an allylamino group including diallylamine compounds such as diallylamine and diallylmethylamine, and triallylamine; monomers having an allylammonium group including diallylammonium salts such as diallyldimethylammonium chloride; triallyl isocyanurate; 1,3-diallylurea; triallyl phosphate; and diallyl disulfide. Among these, more preferred are monomers having an allyl ether group, in which a polymerization degree and the amount of double bonds can be easily controlled. Such a monomer can be copolymerized with vinyl acetate to give a vinyl alcohol-based polymer in which a side chain has an allyl group.

In addition to the above polyfunctional monomers, further monomers which can be mentioned include monomers having a (meth)acrylic moiety such as ethyleneglycol di(meth)acrylate, diethyleneglycol di(meth)acrylate, triethyleneglycol di(meth)acrylate, polyethyleneglycol di(meth)acrylate, propyleneglycol di(meth)acrylate, polypropyleneglycol di(meth)acrylate, glycerol di(meth)acrylate, glycerol tri(meth)acrylate, pentaerythritol tri(meth)acrylate, trimethylolpropane tri(meth)acrylate, ditrimethylolpropane tetra(meth)acrylate, pentaerythritol tetra(meth)acrylate, dipentaerythritol hexa(meth)acrylate and isocyanuric acid tri(meth)acrylate; monomers having a (meth)acrylamide moiety such as N,N'-methylenebis(meth)acrylamide and N,N'-ethylenebis(meth)acrylamide; divinylbenzene; and trivinylbenzene.

In a process of copolymerizing vinyl acetate with a polyfunctional monomer, the copolymerization is preferably conducted with a molar ratio of a polyfunctional monomer to vinyl acetate of 0.05/100 to 2/100. A copolymerization method can be, for example, bulk polymerization, solution polymerization, suspension polymerization, emulsion polymerization or the like. The polymerization can be performed neat or in the presence of an alcoholic solvent. Among these, preferred are neat bulk polymerization or solution polymerization using an alcoholic solvent. Examples of an alcoholic solvent which can be used include, but not limited to, methanol, ethanol and propanol, which can be used alone or in combination of two or more. A polymerization style can be, but not limited to, any of batch polymerization, semi-batch polymerization, continuous polymerization and semi-continuous polymerization.

When vinyl acetate is copolymerized with a polyfunctional monomer, a rate of polymerization of vinyl acetate is preferably 20 to 95%. If the rate of polymerization is less than 20%, the amount of a vinyl ester-based polymer produced per unit time may be reduced, leading to reduction in production efficiency. Furthermore, a cost for recovering vinyl acetate may be increased. In the light of a production efficiency and a cost, the rate of polymerization is more preferably 30% or more, furthermore 40% or more. If it is more than 95%, a crosslinking reaction may excessively proceed, which deteriorates water solubility of a vinyl alcohol-based copolymer produced. In the light of inhibiting a crosslinking reaction, the rate of polymerization is more preferably 80% or less, further preferably 70% or less.

A polymerization temperature and a method for controlling a polymerization temperature are as described in a process for producing a vinyl alcohol-based polymer in which a main chain has a double bond. An initiator for the copolymerization can be selected from those described above. In the copolymerization, additional monomer can be involved in the copolymerization, without departing the scope of the present invention. Here, the type of the additional monomer and a copolymerization amount of the monomer are as described above. A saponification method is also as described above.

A saponification degree of a vinyl alcohol-based polymer of the present invention is 70 mol % or more. If a saponification degree is less than 70 mol %, water resistance of a coated surface is deteriorated, and a vinyl alcohol-based polymer may become insoluble in water. A saponification degree is preferably 80 mol % or more, more preferably 90 mol % or more. It may be difficult to industrially produce a vinyl alcohol-based polymer with too high saponification degree, therefore the saponification degree is 99.9 mol % or less.

The above saponification degree is as measured by a measuring method of a saponification degree in accordance with JIS-K6726 (1994). Here, units other than a vinyl alcohol, vinyl acetate or polyfunctional monomer unit are, if any, in a small amount, and generally negligible.

A preferable embodiment of the present invention is an aqueous solution containing a vinyl alcohol-based polymer. The aqueous solution can contain a small amount of organic solvent, and/or a small amount of organic or inorganic particles insoluble in water. A concentration of the vinyl alcohol-based polymer in the aqueous solution is preferably 1 to 30% by mass.

A preferable embodiment of the present invention is a coating agent comprising an aqueous solution containing a vinyl alcohol-based polymer. In particular, a vinyl alcohol-based polymer of the present invention is useful as a component of a coating agent for a paper. A concentration of a vinyl alcohol-based polymer in a coating agent is preferably 2 to 30% by mass. If the concentration is less than 2% by mass, application efficiency may be reduced. The concentration is more preferably 5% by mass or more. If the concentration is more than 30% by mass, high-speed coatability may be deteriorated. The concentration is more preferably 25% by mass or less.

The above coating agent can contain components other than a vinyl alcohol-based polymer of the present invention as long as the effects of the present invention are not impaired. Examples of the other components include aqueous dispersible resins such as SBR latex, NBR latex, a vinyl acetate emulsion, an ethylene/vinyl acetate copolymer emulsion, a (meth)acrylate emulsion and a vinyl chloride emulsion; raw starches such as those from wheat, corn, rice, potato, ocarina, tapioca and sago palm; decomposition products of a raw starch such as oxidized starch and dextrin; starch derivatives such as etherified starch, esterified starch and cationized starch; cellulose derivatives such as methylcellulose, hydroxyethylcellulose and carboxymethylcellulose (CMC); monosaccharides such as glucose, fructose, isomerized sugar and xylose; disaccharides such as maltose, lactose, sucrose, trehalose, palatinose, reduced maltose, reduced palatinose and reduced lactose; oligosaccharides such as starch syrup, isomalto-oligosaccharide, fructo-oligossaccharide, lacto-oligosaccharide, soybean oligosaccharide, xylo-oligosaccharide, coupling sugar and cyclodextrine compounds; polysaccharides such as pullulan, pectine, agar, konjac mannan, polydextrose and xanthane gum; albumin; gelatin; casein; gum arabic; polyamide resins; melamine resins; poly(meth)acrylamide; polyvinylpyrrolidone; sodium poly(meth)acrylate; anion-modified PVA; sodium alginate; and water-soluble polyesters. A content of these components in the above coating agent is generally 10% by mass or less.

The above coating agent can contain a pigment, as long as the effects of the present invention are not impaired. The pigment can be generally selected from inorganic pigments (for example, clay, kaolin, aluminum hydroxide, calcium carbonate and talc) and organic pigments (for example, plastic pigments) used for producing a coated paper. A content of these pigment components in the above coating agent is generally 50% by mass or less.

A preferable embodiment of the present invention is a coated article wherein the above coating agent is coated on the surface of a substrate. The substrate is preferably a paper or film substrate. There are no particular restrictions to a method for producing a coated article; for example, the method comprises coating a substrate with a coating agent and then drying the coated substrate.

Examples of a material which can be used as the above paper substrate include known papers or synthetic papers produced by papermaking using a chemical pulp such as hardwood kraft pulps and softwood kraft pulps or a mechanical pulp such as GP (groundwood pulp), RGP (refiner ground pulp) and TMP (thermomechanical pulp). Furthermore, the above paper substrate can be a high-quality paper, a wood-containing paper, an alkaline paper, a glassine paper, a semiglassine paper, or a paper board or white paperboard for a cardboard, a building material, a white chipboard or a chip board. Here, a paper substrate can contain an organic or inorganic pigment, and a papermaking aid such as a paper strengthening agent, a size agent and an yield improver. Furthermore, a paper substrate can undergo various surface treatment.

The above film substrate is preferably a film substrate made of a thermoplastic resin. Examples of a thermoplastic resin include polyolefins, polyesters and polyamides.

A coating equipment can be a 2-roll size press, a gateroll size press, a metering size press, an air knife coater, a bar coater, a roll coater and a blade coater. A coating rate is preferably 100 to 2,000 m/min. If a coating rate is less than 100 m/min, a production efficiency may be deteriorated. A coating rate is more preferably 300 m/min or more. If a coating rate is more than 2,000 m/min, coating may not be uniform. A coat rate is more preferably 1,800 m/min or less. A coating amount can be appropriately selected depending on properties of the paper, and in general, it is preferably about 0.05 to 10 g/m$^2$ per one side of the paper.

Drying after coating can be conducted by, for example, hot air, infrared radiation, a heating cylinder or a combination thereof. A coated article after drying can be humidity-conditioned and calendered for further improving barrier property. The humidity conditioning is preferably conducted under such conditions that a moisture percentage in the paper becomes 5 to 20% by mass. The calendering conditions are preferably a roll temperature of an ambient temperature to 200° C. and a roll linear pressure of 20 to 350 kg/cm.

An air permeability of the coated article thus obtained is preferably 10,000 sec or more, more preferably 20,000 sec or more. If an air permeability is less than 10,000 sec, the coated article may be inferior in toluene barrier property.

There are no particular restrictions to the type of the coated article, and it can be a base paper for a release paper, a barrier paper, a greaseproof paper, a wrapping paper, a paper board, a polyethylene release film, a polypropylene release film and a polyester release film. Among others, a base paper for a release paper in which the above coating agent is coated on the surface of a paper substrate is a preferred embodiment of the present invention. A release layer is formed on the surface of the base paper for a release paper. For forming the release layer, a solvent silicone or non-solvent silicone (emulsion, oligomer) can be used.

Here, a solvent silicone contains a solvent (for example, toluene), so that the base paper must have barrier property to the solvent. When a non-solvent silicone is used, water resistance is required. Since a base paper for a release paper of the present invention meets these requirements, a release paper comprising the base paper for a release paper and a release layer formed on the surface of the base paper for a release paper is also a preferred embodiment.

EXAMPLES

The present invention will be further detailed with reference to Examples. In Examples and Comparative Examples below, "part(s)" and "%" denote, unless otherwise stated, part(s) by mass and % by mass, respectively.

Example 1

[Synthesis of a Vinyl Alcohol-Based Copolymer]

In a 6-liter reaction vessel equipped with a stirrer, a nitrogen inlet, an additive inlet and an initiator inlet were charged 1200 g of vinyl acetate, 1800 g of methanol, and 30.1 g of trimethylolpropane diallyl ether as a polyfunctional monomer, and the mixture was warmed to 60° C. and then the atmosphere of the system was substituted with nitrogen by blowing nitrogen gas for 30 min. A temperature of the reaction vessel was regulated to 60° C., and 2.5 g of 2,2'-azobis(isobutyronitrile) was added to initiate polymerization. During the polymerization, a polymerization temperature was kept at 60° C. After 3 hours, a rate of polymerization reached 47% and then the system was cooled to terminate polymerization. Then, unreacted vinyl acetate was removed under a reduced pressure to obtain a solution of polyvinyl acetate (hereinafter, sometimes abbreviated as "PVAc") in methanol. The PVAc thus obtained was purified by reprecipitating five times using acetone as a good solvent and hexane as a poor solvent, and then the purified PVAc was vacuum-dried. Then, the PVAc obtained was dissolved in deuterated chloroform followed by $^1$H-NMR spectrometry. The measurement results are shown in FIG. 2. From the spectrum in FIG. 2, the amounts of trimethylolpropane diallyl ether introduced into a main chain and ethylenic double bonds introduced into a side chain was calculated to be 1.5 mol % and 0.7 mol %, respectively.

A concentration of the PVAc in methanol was adjusted to 30%, and an NaOH solution in methanol (concentration: 10%) was added such that an alkali molar ratio (mole number of NaOH/mole number of vinyl ester units in the PVAc) was 0.03, to initiate saponification. The vinyl alcohol-based copolymer obtained was washed with methanol. Thus, a vinyl alcohol-based copolymer with a saponification degree of 98.6 mol % was obtained. The vinyl alcohol-based copolymer obtained was dissolved in water at 90° C. to prepare aqueous 4% by mass and 8% by mass solutions. Here, the vinyl alcohol-based copolymer was completely dissolved in water. These aqueous solutions had a viscosity of 12.5 and 82 mPa·s, respectively, as determined using a Brookfield viscometer under the conditions of 60 rpm and 20° C.

[Evaluation of High-Speed Coatability]

Using the vinyl alcohol-based copolymer obtained above, an 8% aqueous solution (coating liquid) was prepared. This coating liquid was coated on a high-quality paper (basis weight: 65 g/m$^2$) at a coating temperature of 30° C. and a coating rate of 1200 m/min with a space between a paper and a blade of 0.004 mm using a blade coater. Here, a shear rate of the coating liquid is 5×10$^6$/s. After the coating, it was dried in a drum dryer at 80° C. for 5 min. Uniformity of coating with the coating liquid on the coated paper obtained was evaluated for a coated paper in which colored toluene had been applied to the coated surface by a brush, in accordance with the following criteria.

A: no strike through, no color irregularity in the coated surface

B: no strike through, but uneven and irregularly colored coated surface

C: some strike through and color irregularity in the coated surface

D: severe strike through and color irregularity in the coated surface

[Evaluation of Water Resistance of a Film]

Using the vinyl alcohol-based copolymer obtained above, a 4% aqueous solution was prepared. This aqueous solution was casted at 20° C. to produce a film with a thickness of 40 μm. The obtained film was heated at 120° C. for 10 min, and then cut into pieces with a size of 10 cm×10 cm, to give test pieces. This test piece was immersed in distilled water at 20° C. for 30 min and removed (collected), and water on the surface was wiped with a gauze and a mass of the test piece swollen with water was measured. Then, the test piece after determining a water-swollen mass was dried at 105° C. for 16 hours, and then a dry mass was determined. A degree of swelling (-fold) was determined by dividing a water-swollen mass by a dry mass and rated in accordance with the following criteria.

A: less than 8.0-fold

B: 8.0-fold or more and less than 10.0-fold

C: 10.0-fold or more, or an immersed test piece could not be collected.

[Size Press Coating Test]

(Preparation of a Sample)

Using the vinyl alcohol-based copolymer obtained above, an 8% by mass aqueous solution was prepared. This aqueous solution was coated on a glassine paper (Canadian Standard Freeness: 200 mL) with a basis weight of 80 g/m$^2$ under the conditions of 50° C. and 100 m/min, using a testing 2-roll size press machine (Kumagai Riki Kogyo Co., Ltd.). After the coating, the paper was dried at 110° C. for 1 min to prepare a coated paper. The coating amount (both sides) of the coating liquid as converted to solid was 1.8 g/m$^2$.

(Calendering)

The coated paper obtained in the above process was humidity-conditioned in a thermo-hygrostat for 72 hours, to regulate a water content to 17% by mass. A water-content was determined in accordance with JIS P8127. Then, the paper was supercalendered (150° C., 250 kg/cm, 10 m/min, single treatment) to give a sample. The physical properties of this sample were evaluated by the following measurement method.

(Measurement of Air Permeability)

An air permeability of the sample was measured by an Oken type smoothness and air permeability tester in accordance with JIS P8117. The result is shown in Table 2.

(Evaluation of Toluene Barrier Property)

After a colored toluene (red) was applied to the coated surface of the sample (5×5 cm), a degree of strike through to the reverse side (small red spot or coloration of the whole coated surface) to the rear face was rated in accordance with the following criteria.

A: no spots in the rear face

B: many spots were generated (about 10 to 20% of the toluene coated surface)

C: about 50% of the coated surface was colored

D: the whole coated surface was colored

[Peelability of a Silicone Film]

Using the vinyl alcohol-based copolymer obtained above, a 4% aqueous solution was prepared. This aqueous solution was casted at 20° C. to obtain a film with a thickness of 40 μm. The film obtained was coated with a mixed solution of a silicone "LTC1056L" and a platinum catalyst "SRX212 CATALYST" (mixing mass ratio: 100/0.6) from Dow Corning Toray Co., Ltd. using an applicator bar to a coating amount of 1.5 g/m$^2$, and the film was dried at 110° C. for 8 min, to give a silicone coat film. The silicone layer obtained was strongly rubbed by a thumb 10 times, and from the state of the peeled silicone layer, adhesiveness between the silicone and the vinyl alcohol-based copolymer was evaluated in accordance with the following criteria.

A: no peeling of the silicone film
B: the silicone film was partly peeled off
C: the silicone film was substantially completely peeled off

[Synthesis of a Vinyl Ester-Based Copolymer by Esterification]

In a 100 mL test tube were weighed 1 g of the vinyl alcohol-based copolymer obtained above, 17.8 g of acetic anhydride and 3.5 g of pyridine, which were then mixed using a Teflon® rod. After cooling the test tube, 0.11 g of dimethylaminopyridine was added to the test tube, and the mixture was mixed with a Teflon® rod under ice-cooling for 3 min. Then, the test tube was heated in an oil bath at 60° C., and the content was mixed with a Teflon® rod every 30 min, and after 240 min from initiation of heating, the vinyl alcohol-based copolymer charged was completely dissolved. Heating at 60° C. was continued for additional 60 min and then the vinyl ester-based copolymer solution obtained was slowly added dropwise to 500 mL of distilled water, to precipitate the vinyl ester-based copolymer in water. After removing water, the copolymer was purified by reprecipitating three times using acetone and water, and then washed with boiling distilled water three times. The vinyl ester-based copolymer obtained was vacuum-dried to give a vinyl ester-based copolymer. For the copolymer, a weight-average molecular weight Mw and a limiting viscosity [η] were measured as described below.

[Measurement of a Weight-Average Molecular Weight and a Limiting Viscosity]

The vinyl ester-based copolymer obtained above was dissolved in THF at a concentration of 0.4% by mass, and it was measured for a weight-average molecular weight Mw and a limiting viscosity [η] using Gel Permeation Chromatography (GPC) connected to a multiangle light scattering detector (Multi-Angle Light Scattering, MALS) and a viscosity detector (VIS). Here, for calculating a weight-average molecular weight Mw, a differential refractive index (dn/dc) which was separately measured and calculated, 0.0583 mL/g, was used. The measurement conditions are as follows.

Multiangle light scattering detector: DOWN EOS, from Wyatt Technology Corporation
High-sensitive differential refractive index detector: OptilabrEX, from Wyatt Technology Corporation
Viscosity detector: ViscoStar II, from Wyatt Technology Corporation
Pump: Alliance-2695, from Waters Corporation
Column: Shodex KF802+KF806L×2
Mobile phase: tetrahydrofuran (THF)
Measurement temperature: 40° C.
Injection volume: 100 μL
dn/dc=0.0583 mL/g Examples 2 to 10

A vinyl alcohol-based copolymer was produced as described in Example 1, except that the polymerization conditions were changed to as shown in Table 1. Then, the vinyl alcohol-based copolymer obtained was evaluated as described in Example 1. The results are shown in Tables 1 and 2.

Example 11

In a 6-liter reaction vessel equipped with a stirrer, a nitrogen inlet, an additive inlet and an initiator inlet were charged 2250 g of vinyl acetate, 750 g of methanol, and 40 g of acetaldehyde, and then the atmosphere of the vessel was substituted with nitrogen by blowing nitrogen gas. A temperature of the reaction vessel was regulated to 60° C., and 5.7 g of 2,2'-azobis(isobutyronitrile) was added to initiate polymerization. During the polymerization, a polymerization temperature was kept at 60° C. After 7 hours, a rate of polymerization reached 90% and then the system was cooled to terminate polymerization. Then, unreacted vinyl acetate was removed under a reduced pressure to obtain a solution of polyvinyl acetate (hereinafter, sometimes abbreviated as "PVAc") in methanol. A concentration of the PVAc in methanol was adjusted to 30%, and an NaOH solution in methanol (concentration: 10%) was added such that an alkali molar ratio (mole number of NaOH/mole number of vinyl ester units in the PVAc) was 0.05, to initiate saponification. The vinyl alcohol-based copolymer obtained was washed with methanol, and then dried in a hot-air dryer (preset temperature: 100° C.) for one hour. Thus, a vinyl alcohol-based copolymer with a saponification degree of 99.5 mol % was obtained. Next, this vinyl alcohol-based polymer was heated at 120° C. for 8 hours under an air stream, to provide a vinyl alcohol-based polymer containing a double bond. This vinyl alcohol-based polymer was dissolved in deuterated dimethyl sulfoxide for $^1$H-NMR spectrometry. The measurement results are shown in FIG. 3. From the spectrum in FIG. 3, the amount of ethylenic double bonds introduced was estimated to be 0.4 mol %. Using the vinyl alcohol-based polymer thus obtained, evaluations were conducted as described in Example 1. The results are shown in Tables 1 and 2.

Comparative Examples 1 to 7

Evaluations were conducted as described in Example 1, except that a vinyl alcohol-based polymer was not synthesized, but "PVA-105", "PVA-117", "PVA-124", "PVA-145", "KL-118", "R-2105" or "R-1130" from Kuraray Co., Ltd. was used. The results are shown in Tables 1 and 2. Here, "PVA-105", "PVA-117", "PVA-124" and "PVA-145" are unmodified polyvinyl alcohols. "KL-118" is a modified polyvinyl alcohol containing monomer units having a carboxylic group. "R-2105" and "R-1130" are a modified polyvinyl alcohol containing monomer units having a silyl group. These PVAs are commercially available from Kuraray Co., Ltd.

Comparative Example 8

In a 3 liter reaction vessel equipped with a stirrer and an additive inlet, 100 g of "PVA-117" from Kuraray Co., Ltd. was dissolved in 900 g of water, and to the mixture was added hydrochloric acid, to adjust the aqueous solution to pH 1.5. After the reaction vessel was warmed to 90° C., 1.45 g of 10-undecylenic aldehyde was added from the additive inlet, and then stirring was continued for 30 min. After cooling, the reaction was terminated by adjusting the pH 7 by adding an aqueous solution of sodium hydroxide, to give an aqueous solution of a vinyl alcohol-based copolymer having a double bond. Then, the aqueous solution was poured into 3 liter of hexane, to precipitate the vinyl alcohol-based copolymer in hexane. The precipitated solid was collected by filtration and the residual hexane was removed by drying in vacuo, to isolate a vinyl alcohol-based copolymer as a solid. The isolated vinyl alcohol-based copolymer was dissolved in deuterated dimethyl sulfoxide for $^1$H-NMR spectrometry. From the results, the amount of ethylenic double bonds introduced was estimated to be 0.4 mol %. Using the vinyl alcohol-based copolymer thus obtained, evaluations were conducted as described in Example 1. The results are shown in Tables 1 and 2.

Comparative Example 9

In a 5 liter reaction vessel equipped with a stirrer, a nitrogen inlet and an additive inlet which can keep a superatmospheric pressure were charged 860 g of vinyl acetate and 140 g of methanol, and the atmosphere of the reaction vessel was substituted with nitrogen by blowing nitrogen gas. A temperature of the reaction vessel was regulated to 80° C., and 0.04 g of 2,2'-azobis(isobutyronitrile) was added to initiate polymerization in the closed system. During the polymerization, a polymerization temperature was kept at 80° C. After 4 hours, a rate of polymerization reached 60% and then the system was cooled to terminate polymerization. Then, unreacted vinyl acetate was removed under a reduced pressure to obtain a solution of PVAc in methanol. A concentration of the PVAc in methanol was adjusted to 30%, and an NaOH solution in methanol (concentration: 10%) was added such that an alkali molar ratio (mole number of NaOH/mole number of vinyl ester units in the PVAc) was 0.03, to initiate saponification. The vinyl alcohol-based polymer obtained was washed with methanol, and then dried in a hot-air dryer (preset temperature: 100° C.) for one hour. Thus, a vinyl alcohol-based polymer with a saponification degree of 98.5 mol % was obtained. Using the vinyl alcohol-based polymer thus obtained, evaluations were conducted as described in Example 1. The results are shown in Tables 1 and 2.

TABLE 1

| | | Polymerization conditions | | | | Vinyl alcohol-based polymer | | | |
|---|---|---|---|---|---|---|---|---|---|
| | | Vinyl acetate | Methanol | Modifying agent | | Rate of poly- | Amount of introduced modifying | Amount of ethylenic double bonds in one | Saponifi- cation | Viscosity of an aqueous solution (mPa · s) |
| | PVA (brand) | Amount (g) | Amount (g) | Type | Amount (g) | merization (%) | agent (mol %) | molecule (mol %) | degree (mol %) | 4% | 8% |
| Example 1 | — | 1200 | 1800 | Trimethylolpropane diallyl ether | 30.1 | 47 | 1.5 | 0.7 | 98.6 | 12.5 | 82 |
| Example 2 | — | 1200 | 1000 | 1,4-Butanediol divinyl ether | 19.8 | 58 | 1.1 | 0.5 | 98.3 | 25.0 | 256 |
| Example 3 | — | 1200 | 1000 | 1,4-Butanediol divinyl ether | 19.8 | 58 | 1.1 | 0.5 | 93.4 | 21.6 | 205 |
| Example 4 | — | 1200 | 1200 | 1,4-Butanediol divinyl ether | 4.0 | 60 | 0.2 | 0.1 | 98.1 | 11.4 | 84 |
| Example 5 | — | 1050 | 1950 | Triethyleneglycol divinyl ether | 24.6 | 55 | 1 | 0.5 | 98.6 | 4.5 | 25.2 |
| Example 6 | — | 1800 | 1200 | Trimethylolpropane diallyl ether | 22.0 | 50 | 0.7 | 0.4 | 98.6 | 22.4 | 210 |
| Example 7 | — | 1500 | 1500 | Trimethylolpropane diallyl ether | 10.5 | 60 | 0.4 | 0.2 | 98.9 | 14.0 | 90 |
| Example 8 | — | 1050 | 1950 | Trimethylolpropane diallyl ether | 6.4 | 50 | 0.35 | 0.18 | 98.2 | 5.1 | 29 |
| Example 9 | — | 840 | 1160 | Pentaerythritol triallyl ether | 16.6 | 50 | 0.7 | 0.3 | 98.8 | 18.9 | 175 |
| Example 10 | — | 840 | 1160 | Pentaerythritol triallyl ether | 16.6 | 50 | 0.7 | 0.3 | 92.6 | 17.3 | 156 |
| Example 11 | — | 2250 | 750 | — | — | 90 | — | 0.4 | 99.5 | 6.7 | 32 |
| Comparative Example 1 | PVA- 105 | — | — | — | — | — | — | — | 98.5 | 5.6 | 30.2 |
| Comparative Example 2 | PVA- 117 | — | — | — | — | — | — | — | 98.5 | 28.0 | 352 |
| Comparative Example 3 | PVA- 124 | — | — | — | — | — | — | — | 98.5 | 60.0 | 1020 |
| Comparative Example 4 | PVA- 145 | — | — | — | — | — | — | — | 98.5 | 315.0 | >10,000 |
| Comparative Example 5 | KL- 118 | — | — | (Carboxylic group) | — | — | — | — | 97.0 | 31.5 | 620 |
| Comparative Example 6 | R- 2105 | — | — | (Silyl group) | — | — | — | — | 98.5 | 5.3 | 32 |
| Comparative Example 7 | R- 1130 | — | — | (Silyl group) | — | — | — | — | 98.5 | 25.0 | 450.0 |
| Comparative Example 8 | PVA- 117 | — | — | 10-Undecylenic aldehyde | 1.45 | — | 0.4 | 0.4 | 98.5 | 40.0 | 550 |
| Comparative Example 9 | — | 860 | 140 | — | — | 60 | — | — | 98.5 | 28.0 | 300.0 |

TABLE 2

| | Vinyl ester-based polymer | | | | | | | Size press coating test | | | Peelability |
|---|---|---|---|---|---|---|---|---|---|---|---|
| | Weight-average molecular weight (Mw) | log Mw | Limiting viscosity [η] (dL/g) | log [η] | (log[η] + 3.75)/ log Mw | High-speed coatability | Water resistance | Coating amount (g/m$^2$) | Air permeability (sec) | Toluene barrier property | of a silicone film |
| Example 1 | 480,000 | 5.7 | 0.688 | −0.162 | 0.631 | A | A | 1.7 | 16000 | B | A |
| Example 2 | 823,000 | 5.9 | 0.722 | −0.142 | 0.610 | B | A | 1.8 | 68000 | A | A |
| Example 3 | 940,000 | 6.0 | 0.731 | −0.136 | 0.605 | B | B | 1.7 | >100000 | A | A |
| Example 4 | 327,000 | 5.5 | 0.938 | −0.028 | 0.675 | A | B | 1.8 | 15000 | B | B |
| Example 5 | 158,000 | 5.2 | 0.480 | −0.319 | 0.660 | A | B | 1.9 | 14000 | B | A |
| Example 6 | 789,600 | 5.9 | 0.698 | −0.156 | 0.609 | B | A | 1.5 | 59000 | A | A |
| Example 7 | 626,000 | 5.8 | 0.710 | −0.149 | 0.621 | B | B | 1.7 | 18000 | B | A |
| Example 8 | 53,100 | 4.7 | 0.251 | −0.600 | 0.667 | A | B | 1.9 | 8900 | B | A |
| Example 9 | 589,000 | 5.8 | 0.672 | −0.173 | 0.620 | B | A | 1.5 | 62000 | A | A |
| Example 10 | 645,000 | 5.8 | 0.692 | −0.160 | 0.618 | B | B | 1.8 | >100000 | A | A |
| Example 11 | 76,000 | 4.9 | 0.392 | −0.407 | 0.685 | A | B | 1.9 | 11000 | B | B |
| Comparative Example 1 | 60,800 | 4.8 | 0.372 | −0.429 | 0.694 | A | C | 1.8 | 2400 | D | C |
| Comparative Example 2 | 170,000 | 5.2 | 0.784 | −0.106 | 0.697 | C | B | 1.6 | 7800 | C | C |
| Comparative Example 3 | 263,000 | 5.4 | 1.03 | 0.013 | 0.694 | D | A | 1.7 | 12000 | B | C |
| Comparative Example 4 | 400,000 | 5.6 | 1.35 | 0.130 | 0.693 | not coatable | A | | not coatable | | C |
| Comparative Example 5 | 200,000 | 5.3 | 0.859 | −0.066 | 0.695 | C | C | 1.9 | 9200 | B | C |
| Comparative Example 6 | 55,000 | 4.7 | 0.350 | −0.455 | 0.695 | A | B | 1.8 | 5600 | D | B |
| Comparative Example 7 | 185,000 | 5.3 | 0.814 | −0.089 | 0.695 | D | A | 1.7 | 24000 | B | B |
| Comparative Example 8 | 174,000 | 5.2 | 0.780 | −0.108 | 0.695 | D | B | 1.8 | 8200 | B | A |
| Comparative Example 9 | 173,000 | 5.2 | 0.794 | −0.100 | 0.697 | B | C | 1.6 | 6800 | C | C |

The invention claimed is:

1. A vinyl alcohol-based polymer having an ethylenic double bond with a saponification degree of 70 mol % or more, wherein
the vinyl alcohol-based polymer is water-soluble;
a molar ratio of the ethylenic double bond to a total of vinyl alcohol units and vinyl acetate units is 0.05/100 to 2/100; and
a limiting viscosity [η] and a weight-average molecular weight Mw of a vinyl ester-based polymer which is produced by esterifying the vinyl alcohol-based polymer satisfy formulas (1) and (2):

$$4.7 \leq \log Mw \leq 6.3 \quad (1)$$

$$0.60 < (\log [\eta] + 3.75)/\log Mw < 0.69 \quad (2).$$

2. The vinyl alcohol-based polymer of claim 1, wherein a main chain comprises the ethylenic double bond.

3. The vinyl alcohol-based polymer of claim 1, wherein a side chain comprises the ethylenic double bond.

4. An aqueous solution comprising the vinyl alcohol-based polymer of claim 1.

5. A coating agent comprising the aqueous solution of claim 4.

6. A coated article, comprising the coating agent of claim 5 coated on a surface of a paper or film substrate.

7. A base paper for a release paper, comprising the coating agent of claim 5 coated on a surface of a paper substrate.

8. A release paper comprising the base paper of claim 7 and a release layer formed on a surface of the base paper.

* * * * *